A. REA.
RAILWAY ATTACHMENT FOR BICYCLES.
APPLICATION FILED OCT. 29, 1917.
1,254,434.
Patented Jan. 22, 1918.
2 SHEETS—SHEET 1.
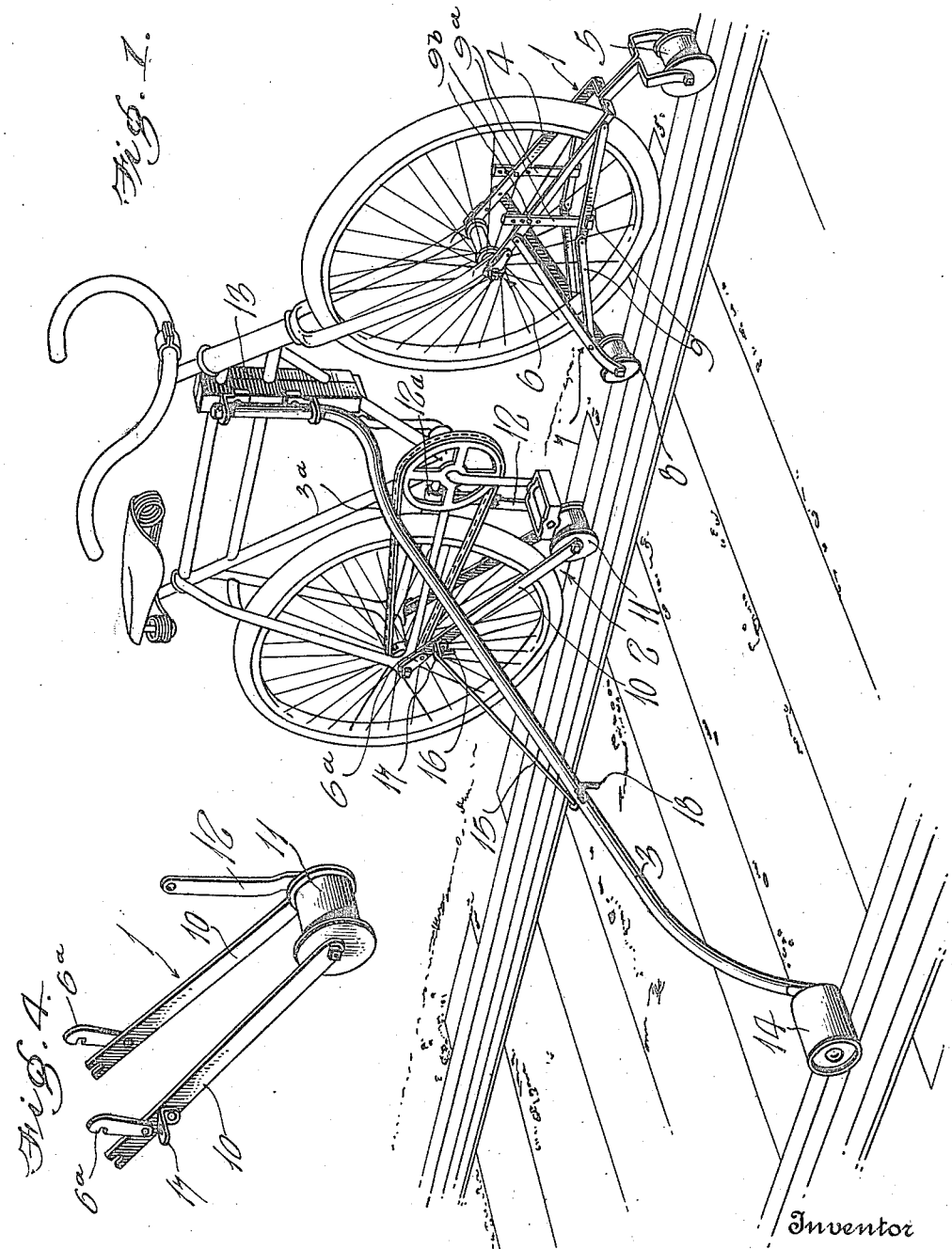
Witness
H. Woodard
Inventor
Agostino Rea
By H. Rivilmontes
Attorneys

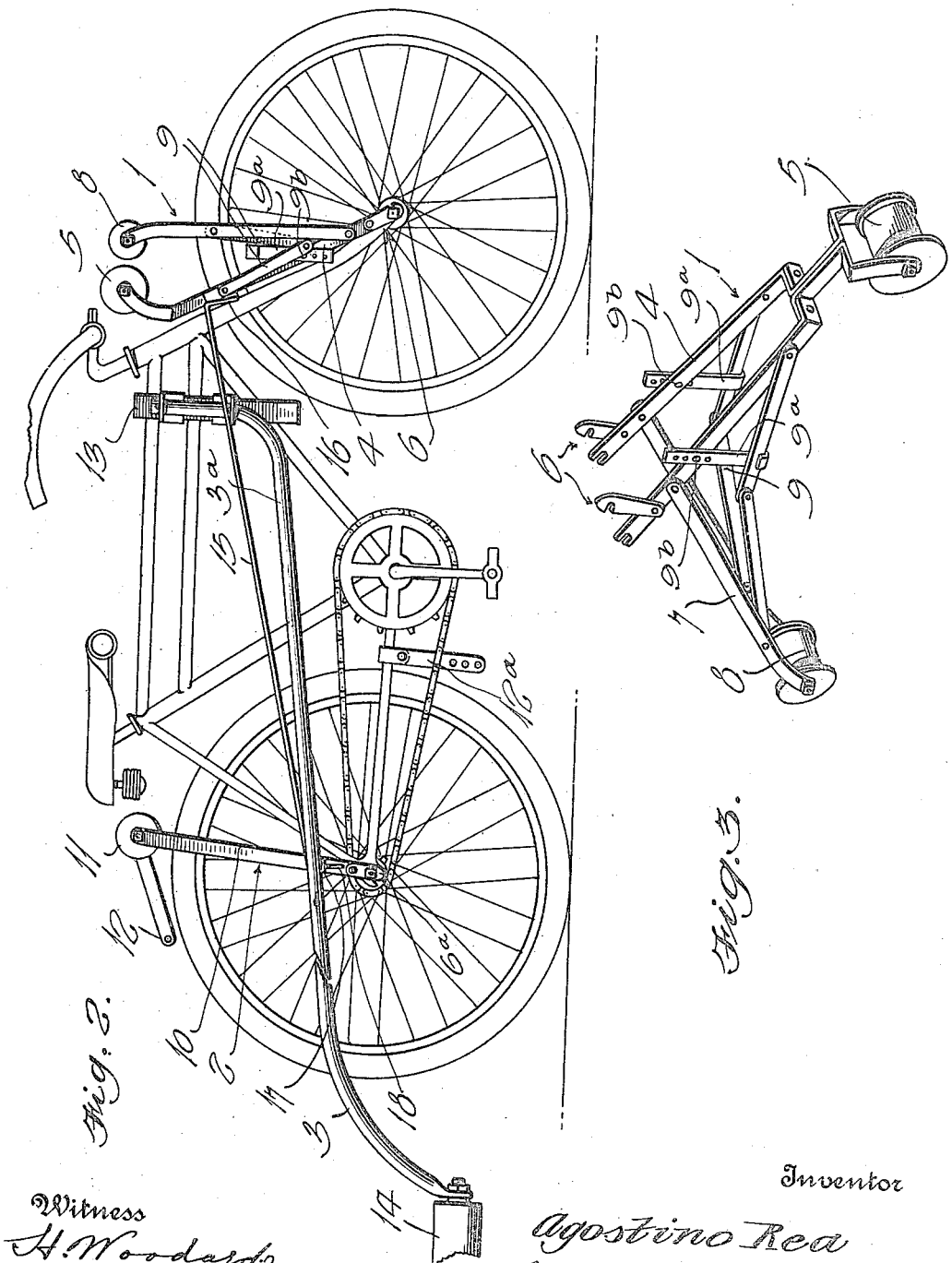

UNITED STATES PATENT OFFICE.

AGOSTINO REA, OF HELPER, UTAH.

RAILWAY ATTACHMENT FOR BICYCLES.

1,254,434.   Specification of Letters Patent.   Patented Jan. 22, 1918.

Application filed October 29, 1917. Serial No. 199,104.

*To all whom it may concern:*

Be it known that I, AGOSTINO REA, a citizen of the United States, residing at Helper, in the county of Carbon and State of Utah, have invented certain new and useful Improvements in Railway Attachments for Bicycles; and I do declare the following to be a full, clear, and exact description of the invention, such as will enable others skilled in the art to which it appertains to make and use the same.

My invention relates to that class of devices utilized for guiding bicycles along railway tracks, and its object is to provide a simply constructed and inexpensive attachment of this character which will be highly efficient and durable when in use, yet may be readily folded so that the bicycle may be used upon highways.

With the foregoing general object in view, the invention resides in the novel features of construction and unique combination of parts to be hereinafter fully described and claimed, the descriptive matter being supplemented by the accompanying drawings which form a part of this specification and in which:—

Figure 1 is a perspective of a bicycle equipped with the invention;

Fig. 2 is a side elevation with the attachment folded; and

Figs. 3 and 4 are perspective views of the front and rear guides, respectively.

In the drawings above briefly described, a common type of bicycle is shown and no description thereof is necessary as its construction is well known. In adapting the bicycle for use upon a railway, however, the improved device is employed. This device consists briefly of front and rear rail engaging guides 1 and 2 to retain the bicycle wheels upon one rail, and a lateral brace arm 3 to engage the other rail and prevent side tilting of the machine, together with numerous details associated with these parts in the manner to be described.

The front guide 1 includes a downwardly and forwardly inclined fork 4 having at its lower end a rail engaging roller 5, whereas its upper end is provided with suitable means 6 for detachable and pivotal connection with the front axle of the bicycle. A rear fork 7 is pivoted to said front fork and is provided with a second rail engaging roller 8, both of the rollers 5 and 8 being flanged on their ends. Suitable toggle links 9 are provided between the two forks 4 and 7, in order to hold them in properly spaced relation. When the device is to be folded, however, these links readily permit the two forks to move into close engagement as shown in Fig. 2, both of said forks being then capable of swinging upwardly so that the fork 4 rests against the fork of the bicycle. To prevent the links 9 from sagging, suspending hooks 9ª are provided, said hooks being adjustably connected at 9ᵇ to the fork 4, so that any required adjustment may be made when applying the attachment to different sizes and makes of machines.

The rear guide 2 consists of a fork 10 inclining downwardly and forwardly from the rear axle of the bicycle and pivotally and detachably connected to said axle by suitable means 6ª, the lower end of said fork having a flanged rail engaging roller 11. The inner flanges of the rollers 5, 8 and 11 are smaller than the outer flanges to permit them to climb the rail at switches.

If found desirable, a brace may be employed for holding the front end of the fork 10 against upward movement, but due to the features of construction yet to be described, the use of this brace is not altogether necessary. When it is employed, it will be formed of two sections 12 and 12ª adjustably and detachably connected in any preferred manner to the rear horizontal fork of the bicycle frame. By this construction, adjustment may be made when first applying the device and the brace may be readily disconnected when required to permit the fork 10 to fold upwardly behind the seat as shown in Fig. 2.

By means of a suitable clamp 13, the inner end of the lateral brace arm 3 is connected with the front end of the bicycle frame, for horizontal swinging, the outer end of said arm having a roller 14 to travel on the rail opposite that upon which the bicycle is supported. A brace rod 15 is pivoted to the arm 3 and extends rearwardly therefrom toward the bicycle, the rear end of said rod having a depending vertical stud 16 which is received in the aperture of a lug 17 extending laterally from the rear fork 10. By this means, the arm 3 is held against rearward swinging and at the same time the brace rod 15 exerts a downward pressure upon the fork 10, so that its roller 11 is maintained in engagement with the rail. Due to this construction, it is obvious that the brace 12 could be eliminated if found desirable. This brace, nevertheless, is a safeguard against jumping of the roller 11 as it passes over widely spaced joints of the rail.

In addition to performing the function above described, the lug 17 acts as a support for the arm 3 when the fork 10 is folded upwardly and said arm is swung rearwardly as shown in Fig. 2. The parts may be retained in these folded positions, by any preferred means, but I preferably equip the arm 3 with a vertical stud 18 which depends therefrom for reception in the aperture of the lug 17. By this feature of construction, it will be obvious that the fork 10 will be held against forward or rearward swinging, and that the arm 3 will be prevented from moving outwardly away from the bicycle. The arm 3 is curved at 3ª to clear the pedal of the bicycle when folded rearwardly.

From the foregoing, taken in connection with the accompanying drawings, it will be obvious that although the device is of great advantage in guiding a bicycle along a railway track, it will not greatly encumber the machine when it is to be used on an ordinary highway, since all parts may be compactly folded as depicted in Fig. 2. Since probably the best results are obtained from the several specific details shown and described, such details constitute the preferred form of the attachment, but I wish it understood that within the scope of the invention as claimed, numerous minor changes may well be made.

I claim:—

1. In a railway attachment for bicycles, means for guiding the front wheel along one of the rails, a fork pivoted to the rear portion of the bicycle frame and inclined downwardly and forwardly, said fork having a rail engaging roller on its lower end, a lateral brace arm extending from the bicycle frame and having a rail engaging roller, a rearwardly extending brace rod for said brace arm, and means connecting the rear end of said brace rod to said fork, whereby the rearward thrust of said rod will force said fork downwardly to maintain its roller in engagement with the rail.

2. In a railway attachment for bicycles, foldable means for guiding the front wheel along one of the rails, a fork pivoted to the rear portion of the bicycle frame and inclined downwardly and forwardly, said fork having a rail engaging roller on its front end and being foldable upwardly behind the bicycle seat when not in use, a lateral brace arm extending from the bicycle frame and having a rail engaging roller, a rearwardly extending brace rod for said arm pivoted to the latter, and means on said fork for connecting said rod thereto and for supporting said brace arm when the attachment is folded.

3. In a railway attachment for bicycles, foldable means for guiding the front wheel along one of the rails, a fork pivoted to the rear portion of the bicycle frame and inclined downwardly and forwardly, said fork having a rail engaging roller and being foldable upwardly behind the bicycle seat when not in use, a lateral brace arm extending from the bicycle frame and having a rail engaging roller, a rearwardly extending brace rod for said arm pivoted to the latter, a vertical stud on the rear end of said rod, and an apertured lug extending laterally from said fork and receiving said stud, said lug supporting said arm when the fork is folded upwardly and the arm folded rearwardly.

4. In a railway attachment for bicycles, foldable means for guiding the front wheel along one of the rails, a fork pivoted to the rear portion of the bicycle frame and inclined downwardly and forwardly, said fork having a rail engaging roller and being foldable upwardly behind the bicycle seat when not in use, a lateral brace arm extending from the bicycle frame and having a rail engaging roller, a rearwardly extending brace rod for said arm pivoted to the latter, a vertical stud on the rear end of said rod, an apertured lug extending laterally from said fork and receiving said stud, said lug supporting said arm when the fork is folded upwardly and the arm folded rearwardly, and a second stud on said arm for reception in the aperture of said lug when the device is folded, whereby to prevent swinging of both said fork and arm.

In testimony whereof I have hereunto set my hand in the presence of two subscribing witnesses.

AGOSTINO REA.

Witnesses:
D. P. O'GRADY,
J. C. METZLER.